(12) United States Patent
Xu et al.

(10) Patent No.: US 9,501,319 B2
(45) Date of Patent: Nov. 22, 2016

(54) METHOD AND APPARATUS FOR SCHEDULING BLOCKING TASKS

(71) Applicant: Tencent Technology (Shenzhen) Company Limited, Shenzhen (CN)

(72) Inventors: Jiatao Xu, Shenzhen (CN); Guomin Chen, Shenzhen (CN); Fangyuan Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/144,456

(22) Filed: May 2, 2016

(65) Prior Publication Data

US 2016/0246643 A1    Aug. 25, 2016

Related U.S. Application Data

(63) Continuation of application No. PCT/CN2014/092408, filed on Nov. 28, 2014.

(30) Foreign Application Priority Data

Nov. 29, 2013  (CN) .......................... 2013 1 0631829

(51) Int. Cl.
  *G06F 9/48*      (2006.01)
  *G06F 13/364*    (2006.01)
  *G06F 9/46*      (2006.01)

(52) U.S. Cl.
  CPC ............. *G06F 9/485* (2013.01); *G06F 13/364* (2013.01)

(58) Field of Classification Search
  None
  See application file for complete search history.

(56) References Cited

U.S. PATENT DOCUMENTS 5,918,248 A * 6/1999 Newell ................. G06F 9/5016
                                                  711/147
2002/0124043 A1* 9/2002 Otero Perez ............ G06F 9/461
                                                  718/107

(Continued)

FOREIGN PATENT DOCUMENTS

| CN | 1967487 A   | 5/2007  |
| CN | 102612157 A | 7/2012  |
| CN | 103002506 A | 3/2013  |
| CN | 104142858 A | 11/2014 |

OTHER PUBLICATIONS

Tencent Technology, ISRWO, PCT/CN2014/092408, Feb. 27, 2015, 7 pgs.

(Continued)

*Primary Examiner* — Eric C Wai
(74) *Attorney, Agent, or Firm* — Morgan, Lewis & Bockius LLP

(57) ABSTRACT

Method, system, and computer-readable medium for scheduling blocking tasks are disclosed. A method includes: executing each of a plurality of task functions in a respective coroutine; detecting a first blocking event for a first task function of the plurality of task functions during execution of the first task function; in response to detecting the first blocking event: setting a respective blocking state of the first task function to a pause state; pausing execution of the first task function; and placing the first task function among a group of paused task functions; and after pausing the execution of the first task function: identifying a second task function among the group of paused task functions for which a respective blocking state has been updated to a running state; removing the second task function from the group of paused task functions; and resuming execution of the second task function.

20 Claims, 5 Drawing Sheets

(56) References Cited

U.S. PATENT DOCUMENTS

| | | | |
|---|---|---|---|
| 2007/0118836 A1* | 5/2007 | Mensing | G06F 9/485 718/102 |
| 2007/0297434 A1 | 12/2007 | Arndt et al. | |
| 2009/0198852 A1* | 8/2009 | Rofougaran | G06F 1/1632 710/300 |
| 2011/0088037 A1 | 4/2011 | Glistvain | |

OTHER PUBLICATIONS

Tencent Technology, IPRP, PCT/CN2014/092408, May 31, 2016, 5 pgs.

* cited by examiner

US 9,501,319 B2

METHOD AND APPARATUS FOR SCHEDULING BLOCKING TASKS

PRIORITY CLAIM AND RELATED APPLICATION

This application is a continuation application of PCT Patent Application No. PCT/CN2014/092408, entitled "METHOD AND APPARATUS FOR SCHEDULING BLOCKING TASKS" filed on Nov. 28, 2014, which claims priority to Chinese Patent Application No. 201310631829.7, entitled "METHOD AND APPARATUS FOR SCHEDULING BLOCKING TASKS" filed on Nov. 29, 2013, both of which are incorporated by reference in their entirety.

FIELD OF THE TECHNOLOGY

The present disclosure relates to the field of computer technologies, and in particular, to a method and an apparatus for scheduling blocking tasks.

BACKGROUND OF THE TECHNOLOGY

When executing a task that requires I/O (input/output), a conventional application framework in computer technologies generally needs to enter a pause state because of waiting for data input. For example, when a socket function monitoring port is invoked to wait to receive data sent by a remote server or monitor an input stream corresponding to a system input event, the pause state is entered, and as a result, execution of program processes cannot be continued.

To avoid a program from entering the pause state because of waiting for I/O, the conventional application framework generally executes a blocking task in a respective thread, that is, a program is executed in a multi-thread manner, and when a certain thread is blocked because of executing an I/O task, the thread can be switched to other threads by means of scheduling by an operating system, so as to ensure asynchronous execution.

However, because an overhead for the operating system to create and manage threads is large, the number of times for context switching of the operating system increases exponentially when the application framework is busy with services and creates an excessively large number of threads. But system performance is limited, thereby reducing the number of system concurrent I/O.

It is also possible to change the program logic code into an asynchronous state machine, such that each task can execute multiple states, and increase the execution throughput this way. The problem of this approach is that existing multi-thread programming logic can no longer be used, and redesigning the entire programming architecture is costly and complex.

SUMMARY

As described in the background section, existing techniques for managing blocking tasks in a system have the drawbacks, and a simpler and efficient way that does not require the creation and management of thousands of threads or drastic alternation of the basic existing program architecture is provided herein.

In one aspect, a method of managing blocking tasks include: at a device having one or more processors and memory: executing each of a plurality of task functions in a respective coroutine; detecting a first blocking event for a first task function of the plurality of task functions during execution of the first task function; in response to detecting the first blocking event for the first task function: setting a respective blocking state of the first task function to a pause state; pausing execution of the first task function; and placing the first task function among a group of paused task functions; and after pausing the execution of the first task function in response to detecting the first blocking event for the first task function: identifying a second task function among the group of paused task functions for which a respective blocking state has been updated to a running state; removing the second task function from the group of paused task functions; and resuming execution of the second task function.

In some embodiments, the method further includes: detecting a first unblocking event while the first task function is associated with the pause state; determining whether the first unblocking event corresponds to the first blocking event for the first task function; and in accordance with a determination that the first unblocking event corresponds to the first blocking event for the first task function, changing the respective blocking state of the first task function to the running state. After the respective blocking state of the first task function is changed to the running state: removing the first task function from the group of paused task functions; and resuming execution of the first task function.

In some embodiments, a computer system includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computer system with one or more processors, cause the computer system to perform, or control performance of, the operations of any of the methods described herein. In some embodiments, a computer system includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
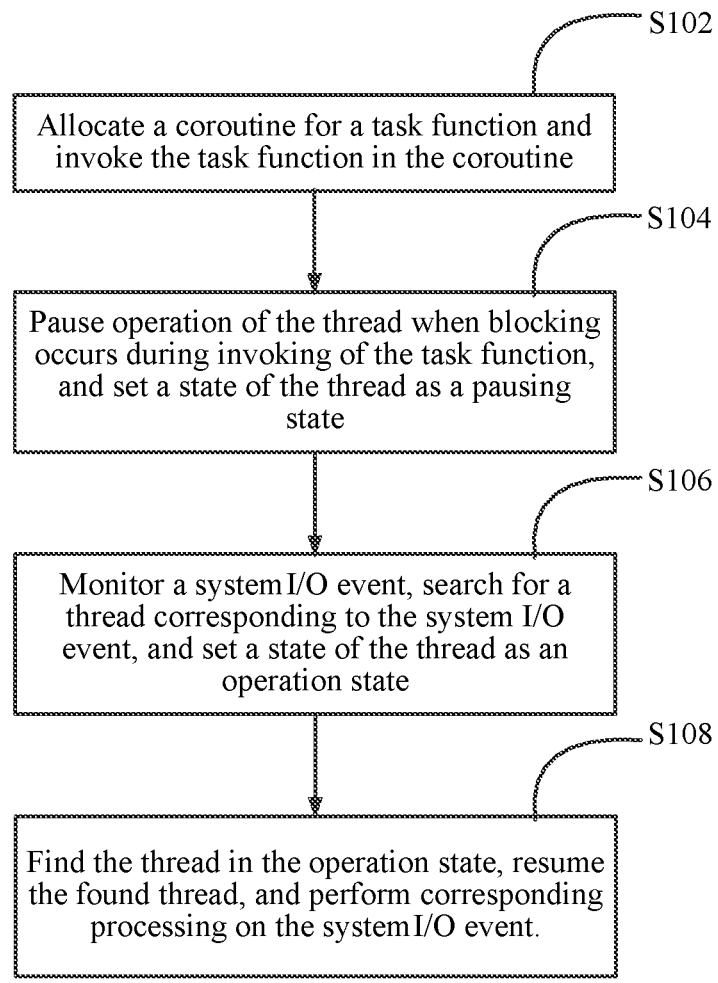
FIG. 1 is a flowchart of a method for scheduling blocking tasks according to some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present technology more comprehensible, the present technology is described in further detail below with reference to accompanying drawings and embodiments. It should be understood that the specific embodiments described herein are merely used to explain the present technology, but not intended to limit the present technology.

In a large service providing system (e.g., a system providing instant messaging services, email services, etc.), the backend server usually has many individual modules each providing a discrete service or function. Between the different services and functions, communication interfaces are defined, the communications between the different service and function modules are then accomplished through the use of agreed communication protocols (e.g., tcp/udp) to realize the functions of the entire system.

The original design of such module based system intends to allow each module can be independently designed, and enjoy its own resources (cpu/memory, disk IO, etc.) without interfering with the operations of other modules. However, as the complexity of the system increases, the reliance and calling on the services and functions of other modules increases greatly, a given function may require the calling of other functions for dozens of times. Thus, the logic tasks spend a long time waiting, and create a bottleneck that severely limits the throughput of the system.

As discussed in the background section, the existing technology for reducing the problem of blocking tasks (e.g., tasks that are in execution, but has to wait for an I/O event before continuing onto the next step) either requires creation of a large number of threads and context switching, or requiring a complete redesign of the programming architecture to create multi-state machines in a single thread or process. In the present disclosure, only a modest amount of modification is required on the existing programming architecture, where only low-level program execution paths need to be altered, thus, the system development efficiency is not compromised. In some embodiments, the disclosed technique does not require the logic code of the existing program to be modified, and a single thread or process will be able to execute multiple logic code paths in parallel.

Coroutines are computer program components that generalize subroutines to allow multiple entry points for suspending and resuming execution at certain locations. For example, in Linux, a coroutine implementation can allow concurrent program code to execute in the memory, and/or allow multiple coroutines to concurrently exist in a single thread or process, and the execution can jump from one coroutine to another coroutine, and then back. This differs from regular sub-routines, where once one sub-routine calls another sub-routine, the execution of the caller sub-routine is finished. An instance of a subroutine only returns once, and does not hold state between invocations. By contrast, coroutines can exit by calling other coroutines, which may later return to the point where they were invoked in the original coroutine.

Hooks are another programming mechanism, which can be called by the operating system for switching between functions or codes. For example, hooking allows intercepting function calls or messages or events to be passed between software components. Code that handles such intercepted function calls, events or messages is called a "hook". For example, the function dlsym( ) can be used to load and jump between codes.

By combining the use of coroutine and hooking, the present technique allows the functions and services to be executed on coroutines, and when the service code execution is blocked at a socket function, the execution is switched to a main event cycle, and causes other coroutine to execute. Thus, the blocking of a single coroutine (e.g., due to waiting for a network event) will not block the entire program from executing. In some embodiments, dozens of coroutines may be executed in parallel, and improving the system throughput by ten-folds. Since the coroutine design is similar to multi-thread design, good code reusage is possible. In some embodiments, the asynchronization of the program execution is realized in the socket level.

In an embodiment, as shown in FIG. 1, a method for scheduling blocking tasks is provided. The method may be performed by a computer program operated in a computer system based on the Von Neumann Architecture. The method includes:

Step S102: Allocate a coroutine to a task function and invoke the task function in the coroutine. The task function is a function that includes a specific service logic task. In the prior art, if the task function is to be executed asynchronously, the task function may be defined in a respective thread in advance. During operation, the respective thread is created first, and the task function is invoked in the respective thread after the respective thread is started.

Generally, a coroutine is also referred to as a micro thread, a fiber or the like. Unlike a thread or process which operates at a bottom layer of an operating system and is uniformly created, scheduled, managed, and cancelled by the operating system, the coroutine operates in a memory space (user space) of an application, and is created, scheduled, managed, and cancelled by the application, which is or need to be neither known nor interfered with by the operating system. That is, the coroutine is a multi-thread mechanism that is created at an upper application layer of the operating system. Various existing programming languages such as Lua, ruby and Google GO all provide a coroutine mechanism.

For example, if an application layer framework provides an abstract class; and it is defined that when an application layer interface function in the abstract class is invoked, a coroutine is first allocated for the application layer interface function and then the code in the function body of the application layer interface function is executed in a memory space of the coroutine; then when an application developer develops an application in the application layer framework; the abstract class can be implemented. A definition of a task function is added into the code in the function body of the application layer interface function, and the task function is invoked in the memory space of the coroutine during operation.

Step S104: Pause operation of the coroutine when blocking occurs during invoking of the task function, and set a state of the coroutine as an operation pausing state.

If the task function is a system I/O function, because subsequent execution of the task function needs to wait for input data brought by a system I/O event, the task function enters a blocking state.

For example, for applications, such as an input method, when a user does not click a keyboard to input a character, that is, an input detection function of the input method has not detected triggering of a corresponding system input event (a system I/O event); the input detection function enters a blocking state. Blocking of the function does not end until the user inputs a character by using the keyboard to trigger the system I/O event.

In another example, for a socket receive function, if a connection request has not be detected in a corresponding port, that is, triggering of a corresponding network connection event ((a system I/O event) is not detected, the receive function enters a blocking state until a connection request arrives at the corresponding port to trigger the network connection event.

In some embodiments, before the step of determining whether the blocking occurs for the task function, a preset same-name function corresponding to the task function may further be invoked by using a hook mechanism; and by using the same-name function, the task function is invoked and whether the blocking occurs for the task function is determined.

For example, if the task function is a socket function, the hook mechanism may be used to detect whether a function with a name "socket" is invoked at a bottom layer of the operating system. If such a function has been invoked, a preset same-name function also with a name "socket" is obtained, where the same-name function may be predefined by a program developer. Based on invocation of the original socket function, code for obtaining a blocking state of the socket function is added. After the same-name function is invoked according to the hook mechanism during operation, the original socket function in a runtime library of the operating system can be invoked, the blocking state of the socket function can also be obtained, and other operations are performed according to the blocking state.

Further, if the task function is a socket function, the step of determining by using the same-name function whether blocking has occurred for the task function may be specifically: obtaining an fd state of the socket function by using the same-name function, and determining whether blocking has occurred for the task function according to the fd state.

In some embodiments, the fd state of the socket function may be categorized as:

FD_READ, preparing to read;
FD_WRITE, preparing to write;
FD_OOB, out-of-band data arriving;
FD_ACCEPT, receiving connection;
FD_CONNECT, completing connection;
FD_CLOSE, closing socket.

In some embodiments, when the fd state is the FD_READ, the socket function enters a blocking state, e.g., a blocking state of waiting for an external connection request.

In some embodiments, if the task function is another system I/O function (for example, a system input function for keyboard character input) used for obtaining system input, the system I/O function can also be replaced by a corresponding same-name function for invoking by using the hook mechanism, and a blocking state of the system I/O function is determined in the same-name function. The blocking state of the system I/O function is determined in the same-name function (e.g., generally an identifier attribute, the determining is according to an attribute value of the identifier attribute). In some embodiments, after detecting that the task function has entered a blocking state, the same-name function may pause the operation of the coroutine where the task function is located by invoking an abstain function (namely, a yield function; since names of functions used by a programming language with the coroutine mechanism to pause the operation are different, the yield function is only used as an example herein and a practical application is not limited to the yield function). After the operation is paused, a state of the coroutine is set as a pause state.

Preferably, a coroutine manager object may be preset, and after the coroutine is created, the coroutine is added into the coroutine manager object for unified management, where the coroutine management area may record an initial address and state information of each coroutine included in the coroutine management area. In this embodiment, state information of the coroutine may be modified to the pause state (e.g., from the running state) in the coroutine manager.

By invoking the task function and determining whether blocking has occurred for the task function by way of invoking a respective same-name function and by using the hook mechanism, a developer only needs to modify a part of code in an application layer framework without modifying a code in an application, when trying to make the foregoing modifications to an existing application layer framework and an application that operates in the application layer framework. For an application, the application still invokes the socket function, and functions of the application are not affected in any way, thereby reducing complexity of program development and maintenance by a developer.

Step S106: Monitor system I/O events, search for a respective coroutine corresponding to a detected system I/O event, and set a state of the coroutine as a running state.

The system I/O event is a system input or output event, and when detecting that there is data input or output, an operating system triggers a corresponding system I/O event. If the system I/O event is socket input, port information corresponding to the socket input may be obtained, and a corresponding coroutine may be found according to the port information. For example, in a preferred embodiment, the port information of the coroutine may be added into the coroutine manager object, and the corresponding coroutine may be found according to the port information after the socket input is received. After the coroutine is found, the pause state of the coroutine may be changed to the running state in the coroutine manager object.

Step S108: Find the coroutine in the running state, resume the found coroutine, and perform corresponding processing on the system I/O event. The resumption of the found coroutine may be implemented by reinvoking the task function. In the coroutine mechanism, reinvoking a code in the coroutine is to resume execution from a code location at which the coroutine was paused previously. I/O data corresponding to the system I/O event may be transmitted to the task function, and the task function ends the blocking state. For example, when input data is received, the socket function enters a code of receiving data flow to continue execution.

Preferably, after the step of setting the state of the coroutine as the running state, the coroutine may further be added to the end of a preset non-blocking coroutine queue.

In some embodiments, the step for finding the coroutine in the running state includes: taking out a corresponding coroutine sequentially at the head of the non-blocking coroutine queue. That is, the non-blocking coroutine queue may be set in the coroutine manager object, and a coroutine corresponding to a task function that can be executed asynchronously may be invoked and resumed sequentially. In other embodiments, a non-blocking coroutine may be stored by using a priority queue, a small task priority queue, and the like.

In some embodiments, after the step of setting the state of the coroutine as the pause state, a blocking timestamp may further added for the coroutine, a coroutine that is in the pause state and for which the blocking timestamp has timed out, invocation of its corresponding task function may be terminated. In other words, a timeout mechanism may be added to a coroutine in a pause state in the coroutine manager object, such that the lifecycle of the coroutine for which operation is paused may be a preset fixed value, or a parameter value provided when the blocking state of the coroutine is set as the pause state. For the coroutine in the pause state and for which the lifecycle has timed out, the task function in the coroutine may be terminated and a corresponding error state or error description is returned.

Figure 2A:
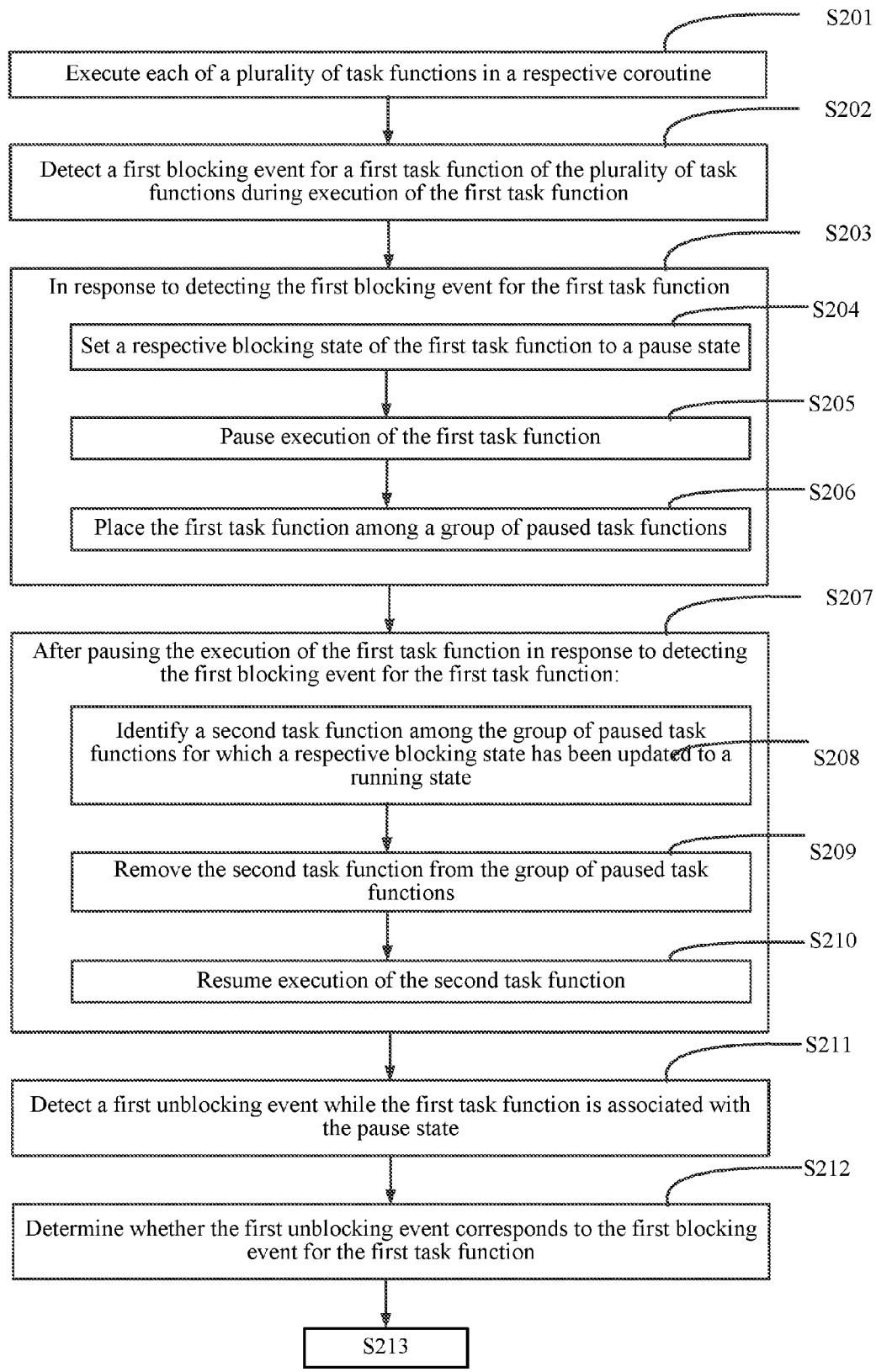
FIGS. 2A-2B are a flowchart of a method for scheduling blocking tasks according to some embodiments.
Figure 2B:
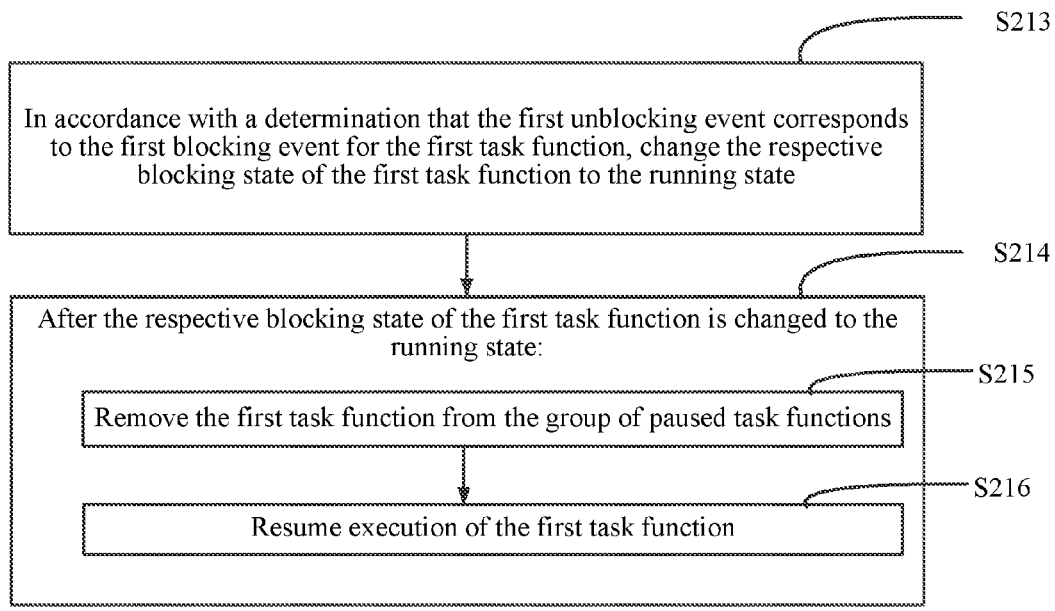

Based on the above description, FIGS. 2A-2B provides a method (e.g., a method performed by a computer) for managing multiple coroutines to enable scheduling of blocking tasks in a system.

As shown in FIGS. 2A-2B, a method of scheduling blocking tasks is performed at a device having one or more processors and memory. The device executes (S201) each of a plurality of task functions in a respective coroutine. For example, the program developer can modify existing code for the task functions to cause them to be executed in respective coroutines when they are initially invoked by an application.

The device detects (S202) a first blocking event for a first task function of the plurality of task functions during execution of the first task function. For example, the first blocking event can be a request for system I/O event that may cause the first task function to wait for an I/O event indefinitely. The first blocking event may also be a network connection event that may cause the first task function to wait for a connection request or an acknowledgement of a connection request indefinitely. Other types of blocking events are possible. The blocking events normally cause the task functions to enter into a wait state until a corresponding unblocking event is detected (e.g., when the needed I/O event or network event is detected).

In response to detecting the first blocking event for the first task function (S203): the device sets (S204) a respective blocking state of the first task function to a pause state, pauses (S205) execution of the first task function, and places (S206) the first task function among a group of paused task functions. For example, a coroutine manager object may perform these steps.

In some embodiments, after pausing the execution of the first task function in response to detecting the first blocking event for the first task function (S207): the device identifies (S208) a second task function among the group of paused task functions for which a respective blocking state has been updated to a running state. The device removes (S209) the second task function from the group of paused task functions, and resumes (S210) execution of the second task function. In this example, the second task function is a task function among the plurality of task functions that have been executed in their respective coroutines, and has previously entered into the pause state due to a respective blocking event detected by the device, and returned to the running state due to a corresponding unblocking event detected by the device. The second task function can have a blocking state indicating of "running", but must wait for resources to be freed up to actually resume execution. Thus, before the coroutine manager takes it out of the group of paused task functions, the second task function remains paused, even though its blocking state has changed from the pause state to the running state. The resource can be freed up when another coroutine is suspended due to a respective blocking event, for example. In some embodiment, if there is sufficient resources for immediate continued execution of the coroutine whose blocking state has changed from paused to running, the resumption of the coroutine is immediately carried out.

In some embodiments, the device detects (S211) a first unblocking event while the first task function is associated with the pause state. The device determines (S212) whether the first unblocking event corresponds to the first blocking event for the first task function. In accordance with a determination that the first unblocking event corresponds to the first blocking event for the first task function, the device changes (S213) the respective blocking state of the first task function to the running state.

In some embodiments, after the respective blocking state of the first task function is changed to the running state (S214): the device removes (S215) the first task function from the group of paused task functions, and resumes (S216) execution of the first task function.

In some embodiments, to determining whether the first unblocking event corresponds to the first blocking event for the first task function, the device determines that the first blocking event is a request for system I/O event, and determines whether the first unblocking event is receipt of an input or confirmation of an output that corresponds to the request for the system I/O event. In some embodiments, to determine whether the first unblocking event corresponds to the first blocking event for the first task function, the device determines that the first blocking event is a network connection event, and determines whether the first unblocking event is receipt or acknowledgment of a network connection request corresponding to the network connection event.

In some embodiments, to identify the second task function among the group of paused task functions for which the respective blocking state has been updated to the running state: the device invokes a hook mechanism to call a respective same-name function for the second task function, and obtains the respective blocking state of the second task based on the respective same-name function.

In some embodiments, the first task function and the second task functions are different instances of the same function. For example, the first task function and the second task function can be functions for enabling the login processes of two different users, or connections of two different client devices.

The above method is merely illustrative. Other steps and features are disclosed elsewhere in the present disclosure and are not repeated here.

Figure 3:
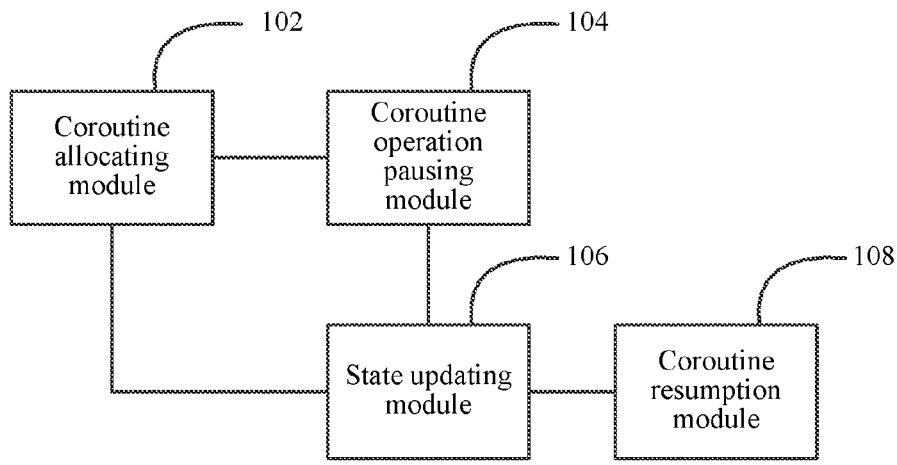
FIG. 3 is a schematic structural diagram of an apparatus for scheduling blocking tasks according to some embodiments.

In some embodiments, as shown in FIG. 3, an apparatus for scheduling blocking tasks includes: a coroutine allocating module 102, a coroutine operation pausing module 104, a state updating module 106, and a coroutine resumption module 108. The coroutine allocating module 102 is configured to allocate a coroutine for a task function and invoking the task function in the coroutine. The coroutine operation pausing module 104 is configured to pause the coroutine corresponding to the task function when blocking occurs for the task function, and set a state of the coroutine as a pause state. The apparatus can be used to perform the methods described herein.

In some embodiments, the state updating module 106 is configured to monitor a system I/O event, search for a thread corresponding to the system I/O event, and set a state of the coroutine as a running state.

In some embodiments, the coroutine resumption module 108 is configured to find the coroutine in the running state, resume the found coroutine, and perform corresponding processing on the system I/O event.

In some embodiments, the state updating module 106 is further configured to add the coroutine for which state is set as the running state to the rear of a preset non-blocking coroutine queue.

In some embodiments, the coroutine resumption module 108 is further configured to take out a corresponding coroutine sequentially at the head of the non-blocked coroutine queue (e.g., the group of paused coroutines that have the "running" state).

Figure 4:
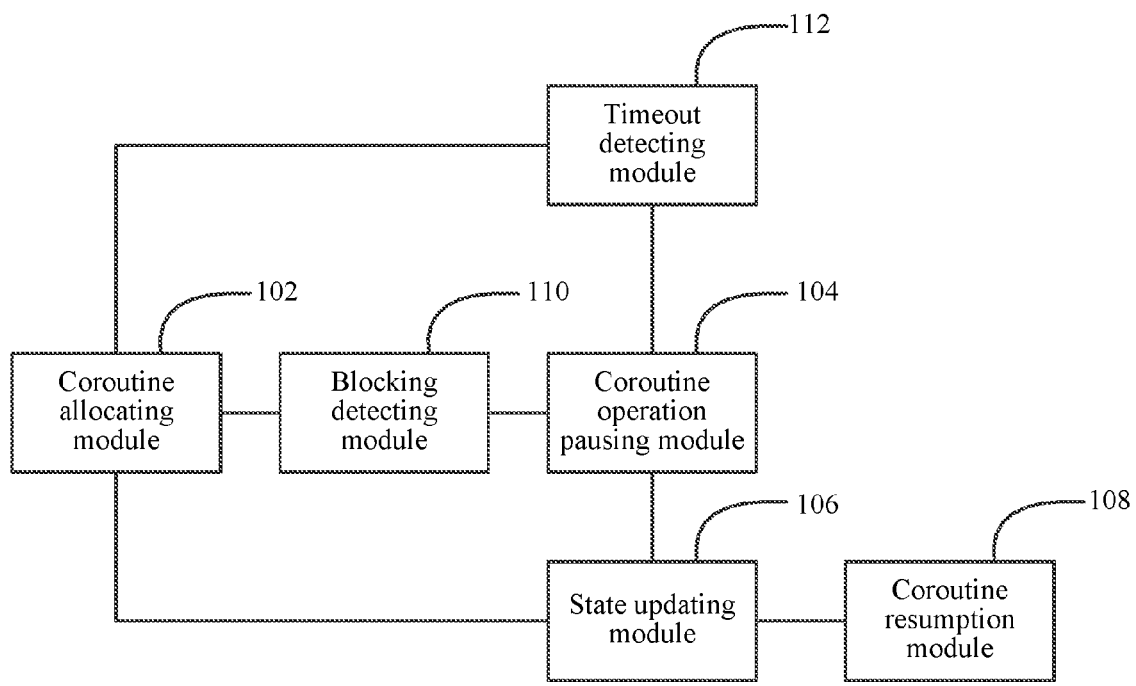
FIG. 4 is a schematic structural diagram of an apparatus for scheduling blocking tasks according to some embodiment.

In some embodiments, as shown in FIG. 4, the apparatus for scheduling blocking tasks further includes a blocking detecting module 110, configured to invoke a preset same-name function corresponding to the task function by using a hook mechanism, and invoke the task function and determine whether the blocking occurs for the task function by using the same-name function.

In some embodiments, the task function is a socket function, where the blocking detecting module 110 is further configured to obtain an fd state of the socket function, and determine whether blocking occurs for the socket function according to the fd state.

In some embodiments, the coroutine operation pausing module 104 is further configured to add a blocking timestamp for the coroutine for which state is set as the pause state.

In some embodiments, as shown in FIG. 4, the apparatus for scheduling blocking tasks further includes a timeout detecting module 112, configured to find a coroutine for which blocking timestamp times out and which is in the pause state, and terminate invoking of a task function in the coroutine.

In the method and apparatus for scheduling a blocking task, a coroutine operates as a carrier of a task function, the coroutine corresponding to the task function is paused, so as to switch to another coroutine for which operation is paused for asynchronous execution when blocking occurs for the task function; a pause state of the coroutine is ended, the coroutine is resumed, and the system I/O event is allocated to the coroutine for processing when the coroutine for which operation is paused has a corresponding triggered system I/O event. Compared with a manner of operating a task function with a thread or a process as a carrier in the prior art, creating and scheduling a coroutine needs less memory resources than creating and scheduling the thread or the process. Therefore, under the same limitation on system resources, more coroutine can be created to process system concurrent I/O tasks, thereby improving the number of system concurrent I/O.

At the same time, for a developer, modifications of the method and apparatus for scheduling blocking tasks are only limited to implementation manners of a bottom layer of an application layer interface function in an existing application framework, that is, the coroutine is set as a carrier for executing the task function by invoking the application layer interface function, so that a service logic code based on an application layer framework does not need to be modified, and the developer only needs to modify a code at a bottom layer of the existing application layer framework, to implement the method and apparatus for scheduling a blocking task, thereby reducing complexity of developing and maintaining in an existing system.

Figure 5:
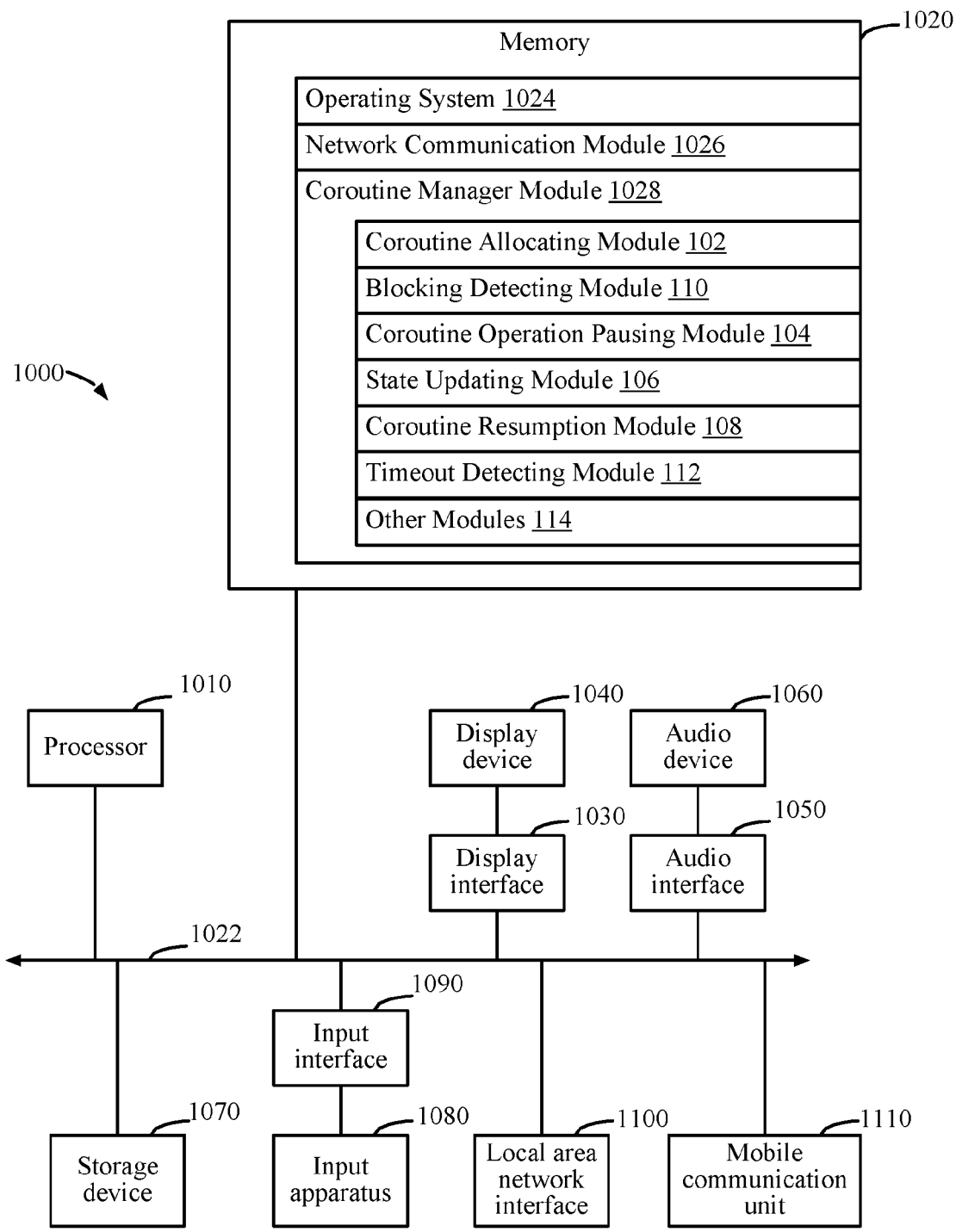
FIG. 5 is a diagram of an apparatus for scheduling blocking tasks according to some embodiments.

As shown in FIG. 5, a module diagram of a computer system 1000 that can implement embodiments of the present invention. The computer system 1000 is only an example of a computer environment that is applicable to the present invention, and should not be regarded as any limitation on use scope of the present technology. The computer system 1000 should also not be interpreted as needing to rely on or include one component or a combination of multiple components of the exemplary computer system 1000 shown in the figure.

The computer system 1000 shown in FIG. 5 is an example of a computer system that is applicable to the present technology. Other architectures with different subsystem configurations may also be used. Similar devices that are known to the public, such as a desktop computer, a notebook, an application server, and a web server, are applicable to some embodiments of the present invention, which, however, are not limited thereto.

As shown in FIG. 5, the computer system 1000 includes a processor 1010, a memory 1020, and a system bus 1022. Various system components, including the memory 1020 and the processor 1010, are connected to the system bus 1022. The processor 1010 is hardware configured to execute a computer program instruction by using a basic algorithm and logic computation in a computer system. The memory 1020 is a physical device configured to store a computing program or data (for example, program state information) temporarily or permanently. The system bus 1022 may be any one of the following several types of bus structures: a memory bus, a storage controller, a peripheral bus, and a local bus. The processor 1010 and the memory 1020 may perform data communication by using the system bus 1022. The memory 1020 includes a read only memory (ROM), a flash memory (neither is shown in the figure), a random access memory (RAM), where the RAM generally refers to a primary memory that loads an operating system and an application.

The computer system 1000 may further include a display interface 1030 (for example, a picture processing unit), a display device 1040 (for example, a liquid crystal display), an audio interface 1050 (for example, an audio card), and an audio device 1060 (for example, a loudspeaker). The display device 1040 and the audio device 1060 are media devices configured to experience multimedia content.

The computer system 1000 generally includes a storage device 1070. The storage device 1070 may be selected from a plurality of non-transitory computer readable mediums, where the computer readable mediums refer to any usable mediums that can access by using the computer system 1000, including two types of mediums: mobile and fixed mediums. For example, the computer readable mediums include, but are not limited to, a flash memory (a micro SD card), a CD-ROM, a digital versatile disk (DVD), another disk optical disk storage device, a magnetic cassette, a magnetic tape, a magnetic disk storage device, another magnetic storage device, or any other medium that can be configured to store needed information and can be accessed by the computer system 1000.

The computer system 1000 further includes an input apparatus 1080 and an input interface 1090 (for example, an IO controller). A user can input an instruction and information to the computer system 1000 by using the input apparatus 1080, for example, a keyboard, a mouse, and a touch panel device on the display apparatus 1040. The input apparatus 1080 is generally connected to the system bus 1022 by using the input interface 1090, and may also be connected by using another interface or bus structure, for example, a universal serial bus (USB).

The computer system 1000 may be connected logically to one or more network devices in a network environment. The network devices may be a personal computer, a server, a router, a smart phone, a tablet computer, or other public network nodes. The computer system 1000 may be connected to a network device by using a local area network (LAN) interface 1100, or a mobile communication unit 1110. A local area network (LAN) refers to a computer network formed by interconnection in a limited area, for example, a home, a school, a computer lab, or an office that uses network media. WiFi and twisted pair wire Ethernet are two most common technologies for building a local area network. WiFi is a technology that can make computer systems 1000 exchange data with each other, or is connected to a wireless network by using radio waves. The mobile communication unit 1110 can move in a wide geographical area, and answers and calls by using a radio communication line. Besides communication, the mobile communication unit 1110 also supports Internet access in a 2G, 3G, or 4G cellular communications system that provide mobile data services.

In some embodiments, memory 1020 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1020, optionally, includes one or more storage devices remotely located from one or more processing units 1010. Memory 1020, or alternatively the non-volatile memory within memory 1020, includes a non-transitory computer readable storage medium. In some implementations, memory 1020, or the non-transitory computer readable storage medium of memory 1020, stores the following programs, modules, and data structures, or a subset or superset thereof:
- operating system 1024 including procedures for handling various basic system services and for performing hardware dependent tasks;
- network communication module 1026 for connecting device 1000 to other computing devices connected to one or more networks via one or more network interfaces 1100 (wired or wireless);
- coroutine manager module 1028, which the management functions described above, including but not limited to: the coroutine allocating module 102, the blocking detecting module 110, the coroutine operation pausing module 104, the state updating module 106, the coroutine resumption module 108, the timeout detecting module 112, and other modules 114, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1020, optionally, stores a subset of the modules and data structures identified above. Furthermore, memory 1020, optionally, stores additional modules and data structures not described above.

It should be noted that a computer system that includes more or less subsystems than the computer system 1000 is also applicable to the present technology. For example, the computer system 1000 may include a blue tooth unit that can exchange data within a short distance, a picture sensor used for photographing, and an accelerometer used for measuring acceleration.

As described in detail in the foregoing, the computer system 1000 applicable to the present technology can execute specified operations of scheduling blocking tasks. The computer system 1000 executes the operations in a manner of the processor 1010 operating a software instruction in a computer readable medium. The software instruction may be read into the memory 1020 from the storage device 1070 or from another device by using the local area network interface 1100. The software instruction stored in the memory 1020 makes the processor 1010 execute the foregoing methods for scheduling blocking tasks. In addition, the present technology can also be implemented by using a hardware circuit or by a hardware circuit combining with a software instruction. Therefore, implementation of the present technology is not limited to any combination of a specified hardware circuit and software.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the technology to the precise forms disclosed. Many modifications and variations are possible in view of the above teachings. The embodiments were chosen and described in order to best explain the principles of the invention and its practical applications, to thereby enable others skilled in the art to best utilize the technology and various embodiments with various modifications as are suited to the particular use contemplated.

What is claimed:

1. A method of scheduling blocking tasks, comprising:
    at a device having one or more processors and memory:
        executing each of a plurality of task functions in a respective coroutine;
        detecting a first blocking event for a first task function of the plurality of task functions during execution of the first task function;
        in response to detecting the first blocking event for the first task function:
            setting a respective blocking state of the first task function to a pause state;
            pausing execution of the first task function; and
            placing the first task function among a group of paused task functions; and
        after pausing the execution of the first task function in response to detecting the first blocking event for the first task function:
            identifying a second task function among the group of paused task functions for which a respective blocking state has been updated to a running state;
            removing the second task function from the group of paused task functions; and
            resuming execution of the second task function.

2. The method of claim 1, further comprising:
    detecting a first unblocking event while the first task function is associated with the pause state;
    determining whether the first unblocking event corresponds to the first blocking event for the first task function; and
    in accordance with a determination that the first unblocking event corresponds to the first blocking event for the first task function, changing the respective blocking state of the first task function to the running state.

3. The method of claim 2, further comprising:
after the respective blocking state of the first task function is changed to the running state:
removing the first task function from the group of paused task functions; and
resuming execution of the first task function.

4. The method of claim 1, wherein determining whether the first unblocking event corresponds to the first blocking event for the first task function further comprises:
determining that the first blocking event is a request for system I/O event; and
determining whether the first unblocking event is receipt of an input or confirmation of an output that corresponds to the request for the system I/O event.

5. The method of claim 1, wherein determining whether the first unblocking event corresponds to the first blocking event for the first task function further comprises:
determining that the first blocking event is a network connection event; and
determining whether the first unblocking event is receipt or acknowledgment of a network connection request corresponding to the network connection event.

6. The method of claim 1, wherein identifying the second task function among the group of paused task functions for which the respective blocking state has been updated to the running state further comprises:
invoking a hook mechanism to call a respective same-name function for the second task function; and
obtaining the respective blocking state of the second task based on the respective same-name function.

7. The method of claim 1, wherein the first task function and the second task functions are different instances of the same function.

8. A system of scheduling blocking tasks, comprising:
one or more processors; and
memory having instructions stored thereon, the instructions, when executed by the one or more processors, cause the processors to perform operations comprising:
executing each of a plurality of task functions in a respective coroutine;
detecting a first blocking event for a first task function of the plurality of task functions during execution of the first task function;
in response to detecting the first blocking event for the first task function:
setting a respective blocking state of the first task function to a pause state;
pausing execution of the first task function; and
placing the first task function among a group of paused task functions; and
after pausing the execution of the first task function in response to detecting the first blocking event for the first task function:
identifying a second task function among the group of paused task functions for which a respective blocking state has been updated to a running state;
removing the second task function from the group of paused task functions; and
resuming execution of the second task function.

9. The system of claim 8, wherein the operations further comprise:
detecting a first unblocking event while the first task function is associated with the pause state;
determining whether the first unblocking event corresponds to the first blocking event for the first task function; and
in accordance with a determination that the first unblocking event corresponds to the first blocking event for the first task function, changing the respective blocking state of the first task function to the running state.

10. The system of claim 9, wherein the operations further comprise:
after the respective blocking state of the first task function is changed to the running state:
removing the first task function from the group of paused task functions; and
resuming execution of the first task function.

11. The system of claim 8, wherein determining whether the first unblocking event corresponds to the first blocking event for the first task function further comprises:
determining that the first blocking event is a request for system I/O event; and
determining whether the first unblocking event is receipt of an input or confirmation of an output that corresponds to the request for the system I/O event.

12. The system of claim 8, wherein determining whether the first unblocking event corresponds to the first blocking event for the first task function further comprises:
determining that the first blocking event is a network connection event; and
determining whether the first unblocking event is receipt or acknowledgment of a network connection request corresponding to the network connection event.

13. The system of claim 8, wherein identifying the second task function among the group of paused task functions for which the respective blocking state has been updated to the running state further comprises:
invoking a hook mechanism to call a respective same-name function for the second task function; and
obtaining the respective blocking state of the second task based on the respective same-name function.

14. The system of claim 8, wherein the first task function and the second task functions are different instances of the same function.

15. A non-transitory computer-readable medium having instructions stored thereon, the instructions, when executed by one or more processors, cause the processors to perform operations comprising:
executing each of a plurality of task functions in a respective coroutine;
detecting a first blocking event for a first task function of the plurality of task functions during execution of the first task function;
in response to detecting the first blocking event for the first task function:
setting a respective blocking state of the first task function to a pause state;
pausing execution of the first task function; and
placing the first task function among a group of paused task functions; and
after pausing the execution of the first task function in response to detecting the first blocking event for the first task function:
identifying a second task function among the group of paused task functions for which a respective blocking state has been updated to a running state;
removing the second task function from the group of paused task functions; and
resuming execution of the second task function.

16. The computer-readable medium of claim 15, wherein the operations further comprise:
detecting a first unblocking event while the first task function is associated with the pause state;

determining whether the first unblocking event corresponds to the first blocking event for the first task function; and in accordance with a determination that the first unblocking event corresponds to the first blocking event for the first task function, changing the respective blocking state of the first task function to the running state.

17. The computer-readable medium of claim 16, wherein the operations further comprise:

after the respective blocking state of the first task function is changed to the running state:

removing the first task function from the group of paused task functions; and resuming execution of the first task function.

18. The computer-readable medium of claim 15, wherein determining whether the first unblocking event corresponds to the first blocking event for the first task function further comprises:

determining that the first blocking event is a request for system I/O event; and determining whether the first unblocking event is receipt of an input or confirmation of an output that corresponds to the request for the system I/O event.

19. The computer-readable medium of claim 15, wherein determining whether the first unblocking event corresponds to the first blocking event for the first task function further comprises:

determining that the first blocking event is a network connection event; and determining whether the first unblocking event is receipt or acknowledgment of a network connection request corresponding to the network connection event.

20. The computer-readable medium of claim 15, wherein identifying the second task function among the group of paused task functions for which the respective blocking state has been updated to the running state further comprises:

invoking a hook mechanism to call a respective same-name function for the second task function; and obtaining the respective blocking state of the second task based on the respective same-name function.

* * * * *